(12) United States Patent
Villatte et al.

(10) Patent No.: US 6,450,207 B2
(45) Date of Patent: Sep. 17, 2002

(54) CIRCUMFERENTIAL-WELD REINFORCING DEVICE

(75) Inventors: Ludovic Villatte, Louveciennes; Philippe Marchal, Vaucresson, both of (FR)

(73) Assignee: ITP (FR)

(*) Notice: Subject to any disclaimer, the term of this patent is extended or adjusted under 35 U.S.C. 154(b) by 0 days.

(21) Appl. No.: 09/788,667

(22) Filed: Feb. 21, 2001

(30) Foreign Application Priority Data

Feb. 21, 2000 (FR) .......................................... 00 02078

(51) Int. Cl.$^7$ .................................................. F16L 9/00
(52) U.S. Cl. ........................ 138/172; 138/177; 285/53; 405/168.2
(58) Field of Search ............... 138/172, 176, 138/178, 177, 110; 285/53; 405/168.1, 168.2

(56) References Cited

U.S. PATENT DOCUMENTS

| | | | | |
|---|---|---|---|---|
| 3,686,747 A | * | 8/1972 | Bagnulo | 285/334.4 |
| 4,011,652 A | * | 3/1977 | Black | 285/53 |
| 4,398,754 A | * | 8/1983 | Caroleo et al. | 156/293 |
| 4,449,852 A | * | 5/1984 | Muszynski | 138/172 |
| 4,644,975 A | * | 2/1987 | Fricker | 138/110 |
| 4,808,031 A | * | 2/1989 | Baker | 138/172 |
| 4,824,147 A | * | 4/1989 | De Gruijter | 174/85 |

FOREIGN PATENT DOCUMENTS

| | | |
|---|---|---|
| DE | 342617 | 11/1921 |
| DE | 621 488 | 11/1935 |
| FR | 679 867 | 4/1930 |
| FR | 2 721 681 | 12/1995 |
| GB | 2 315 835 | 2/1998 |

* cited by examiner

*Primary Examiner*—Patrick Brinson
(74) *Attorney, Agent, or Firm*—Parkhurst & Wendel, LLP

(57) ABSTRACT

The invention relates to a device reinforcing circumferential welds 8 which join two contiguous pipes 6 and 7 in order to increase the fatigue life of said welds by reducing mechanical stresses in them when being subjected to periodic bending.

The device comprises a rigidifying element 10 which is firmly joined to said pipes by a connection means 11, 13, said bush being made of the same material as the pipes. The rigidifying element 10 consists of a bush slipped over the two pipes 6, 7 opposite the weld 8. The connection means is a hardening material 11 such as resin or cement which is injected between bush and pipes and which is confined at this site by shaping, in particular cold-forming, the bush's ends.

The application is to offshore hydrocarbon conveyance conduits subjected to periodic loads.

8 Claims, 3 Drawing Sheets

CIRCUMFERENTIAL-WELD REINFORCING DEVICE

The technical field of the present invention applies to hydrocarbon-carrying sea pipes and in particular to pipes being periodically bent.

For water depths of several hundred meters, the pipe material is selected from those allowing flexible pipes which well withstand the dynamic loads resulting from ocean swells and currents at the oil extraction site. However, at lower depths, this design is more expensive on account of the unit-length cost of flexible pipe.

The exhaustion of the offshore hydrocarbon reserves of conventional operation has led to searches at great depths (of the order of a kilometer). In this case oil conveyance very often is assured by steel pipes used at every stage of extraction and in particular by vertical pipes between the bottom and the sea's surface: in English such pipes are called "risers". The conventional architecture of such a complex is a floating platform into which issue the risers of which the dynamic portion has a length from several hundred meters to a few km. Technically and economically these pipes must not be connected to a rigid structure and must be dimensioned to withstand repetitive loads of large amplitudes. In this geometry and in practice, the steel conduit is considered flexible and therefore is able to withstand dynamic loads at a lesser cost. However this technology is degraded by the short fatigue life of the pipe welds: This conduit is constituted of intermediate pipes about 12 m long each and for instance joined end to end by circumferential welds.

The life of a circumferential weld depends mainly on its quality and on the periodic and dynamic loads it is subjected to.

It is known that the fatigue life of the steel constituting the pipes of a conduit is much higher than that of the welds: the welds are susceptible to micro-cracks and then potentially may rupture.

Accordingly it is the objective of the present invention to create local reinforcements for the welded pipes to increase their rigidity and decrease their shapes. Therefore the pipe conduit's flexibility will be provided by its weld-free portions which are much more fatigue-resistant.

Thus the invention relates to a device reinforcing a circumferential weld of two contiguous pipes which are part of a conduit which shall convey hydrocarbons at sea and comprising a rigidifying element firmly joined by a connection means to said pipes, said rigidifying element being slipped over the two pipes substantially opposite the weld, said reinforcing device being characterized in that the connection means is a mechanical one and is implemented by part or all of the rigidifying element being shaped directly onto the two pipes.

In one feature of the invention, said shape is implemented substantially near the ends and median portion of the rigidifying element.

In another feature of the invention, an elastoplastic material is inserted prior to shaping between the rigidifying element and the pipes either in localized or in continuous manner to limit point stresses on the pipes.

In still another feature of the invention, the inserted material consists of polypropylene or polyethylene or soft steel.

In yet another feature of the invention, the rigidifying element is a hollow element, or a sleeve.

In one embodiment variation of the invention, the invention also relates to a rigidifying device for a two-pipe circumferential weld which comprises a rigidifying element firmly joined by a connection means to said pipes, where said rigidifying element is slipped over the two pipes substantially above each weld, and said reinforcing device is characterized in that the connection means consists of a filler inserted into the play between the pipes and said rigidifying element in order to reduce the stresses arising from the periodic bending of the conduit.

Advantageously the reinforcing element consists of a bush preferably of the same material as the pipes'.

Advantageously again, the filler is a hardening material such as resin or cement.

Advantageously again, the filler is kept in place by shaping the ends of the bush.

The invention offers the foremost advantage of improving the pipe's fatigue life at the weld site.

Another advantage of the device of the invention is a significant drop in the danger of rupture and hence danger of production losses.

Another advantage is the increase in service life of the conduits and hence lowering production costs.

Lastly the invention provides a simple and economic design.

Other features and advantages of the invention are elucidated in the following illustrative description relating to the attached drawings.

As indicated above, the invention only relates to improving the fatigue strength of the welded joints while the static problem does not arise. Therefore any action requiring welding the rigidifying element or bush directly onto one of the pipes (generally speaking a lap joint weld) must be avoided because entailing substantial fatigue degradation: lap joint welds generate micro-cracks and geometric stress concentrations substantially reducing the pipes' fatigue life at these very sites.

The invention in particular applies to offshore hydrocarbon conveyance conduits subjected to periodic loads.

Figure 1:
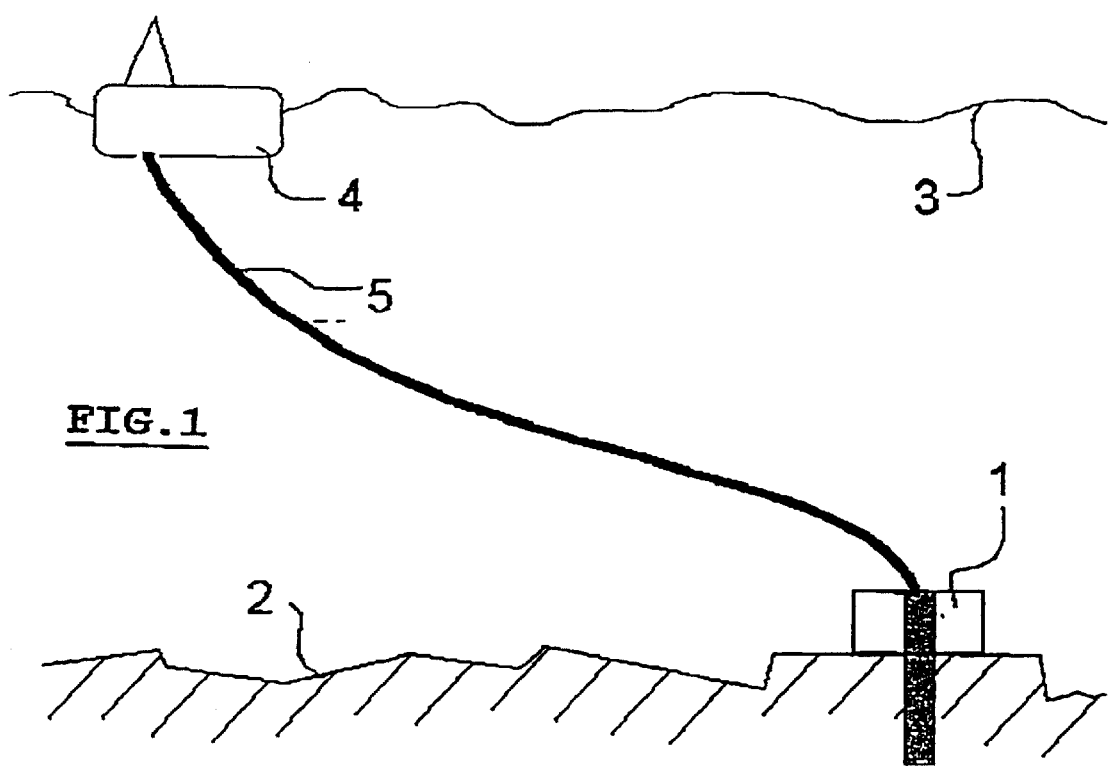
FIG. 1 shows a deep hydrocarbon production site and the hydrocarbon conveyance.

FIG. 1 shows the application of the reinforcing device of the invention to the offshore hydrocarbon conveyance conduit subjected to periodic loads. Illustratively the conduit 5 is mounted between a platform 4 and a well 1 on the sea's floor 2.

Figure 2:
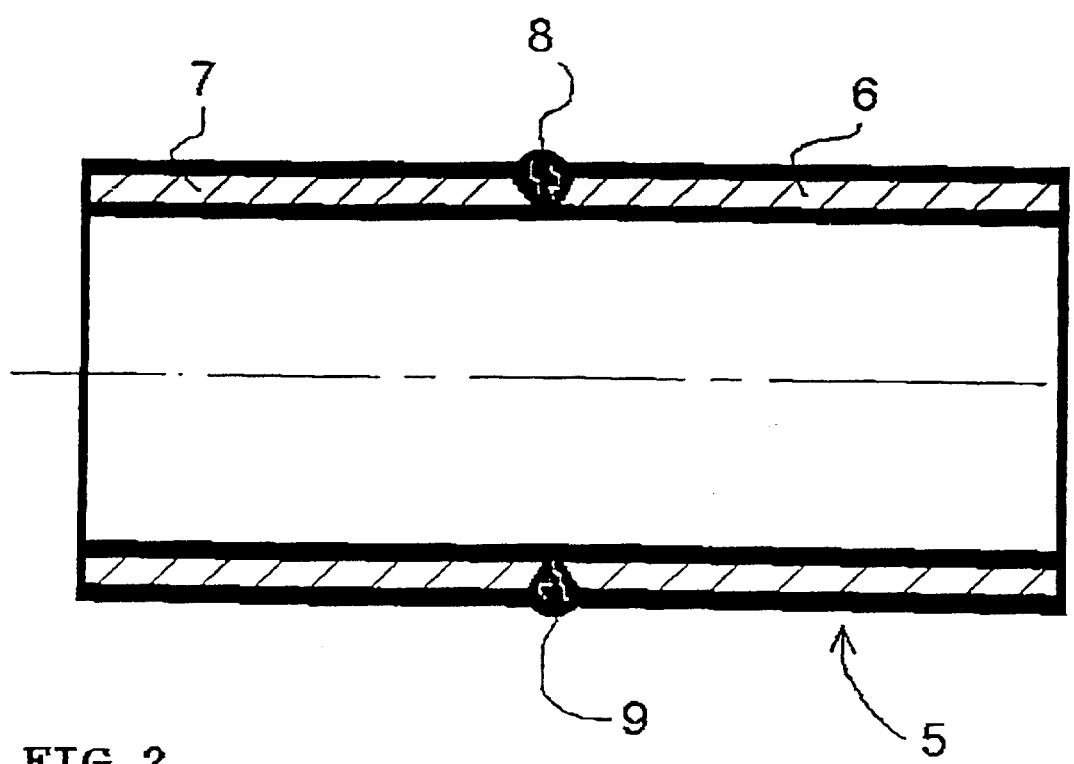
FIG. 2 is a cross-section of a welded joint of a conventional two-pipe assembly.

FIG. 2 shows two inner pipes 6 and 7 of the conduit 5 which are joined end to end by a weld 8. As described above, the weld 8 is the seat of micro-cracks 9. The objective of the invention is precisely to delay the propagation of these micro-cracks by providing a reinforcing element that shall reduce the bending stresses thanks to spreading the bending torque between the joint and the bush.

Figure 3:
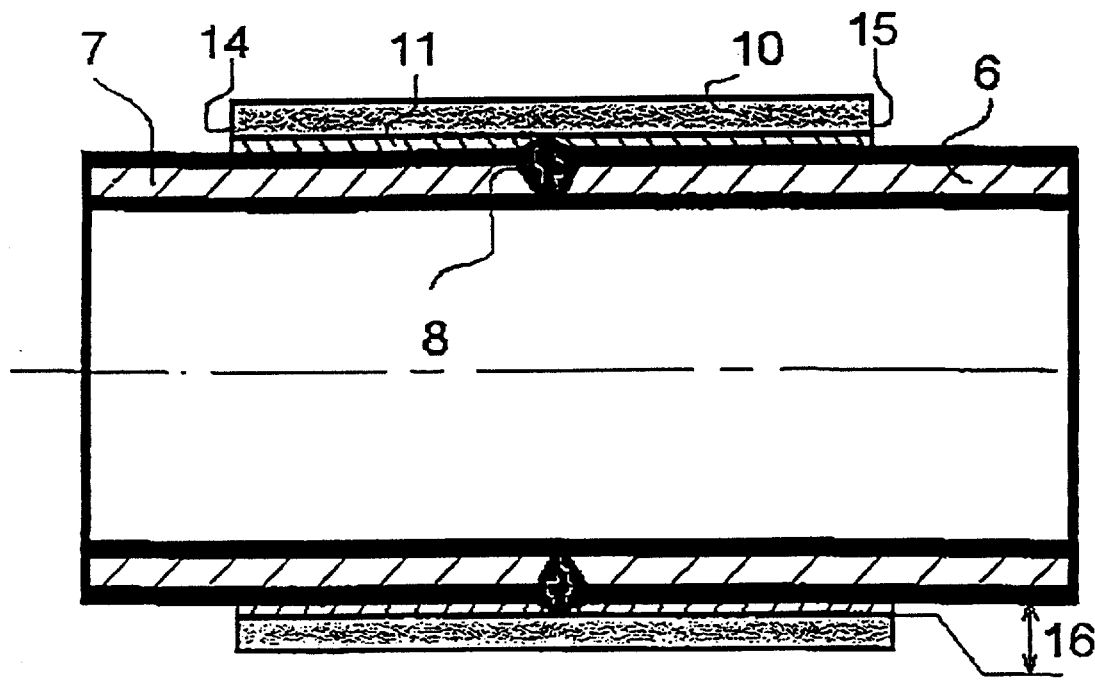
FIG. 3 is a cross-section of the reinforcing device of a first embodiment of the invention.

FIG. 3 shows the conduit 5 fitted with a rigidification device of a first embodiment mode and mounted opposite the weld 8 joining two contiguous pipes 6 and 7. This rigidifying device in this case consists of a substantially cylindrical and hollow element 10 called the "bush". This bush 10 is made of a material offering mechanical properties substantially equivalent to those of the inner pipe (steel as a rule) and its length is about 3 to 6-fold its diameter.

Accordingly metallic materials exhibiting a substantially similar Young's modulus may be used without affecting the bush's behavior. The inside diameter must be adequate to allow sliding the bush 10 opposite the weld 8. The expression "opposite the weld" denotes positioning the two ends 14 and 15 of the bush 10 substantially symmetrically to the weld 8. The residual play 16 between the bush 10 and the inner pipes 6 and 7 is filled for instance by injecting a hardening filler such as a resin or cement or any other suitable material that shall assure a rigid connection between the bush 10 and the inner pipes 6 and 7 and thereby providing a high-performance mechanical link. It was found that this connection assures shunting a large part of the bending torque into the bush.

Figure 4:
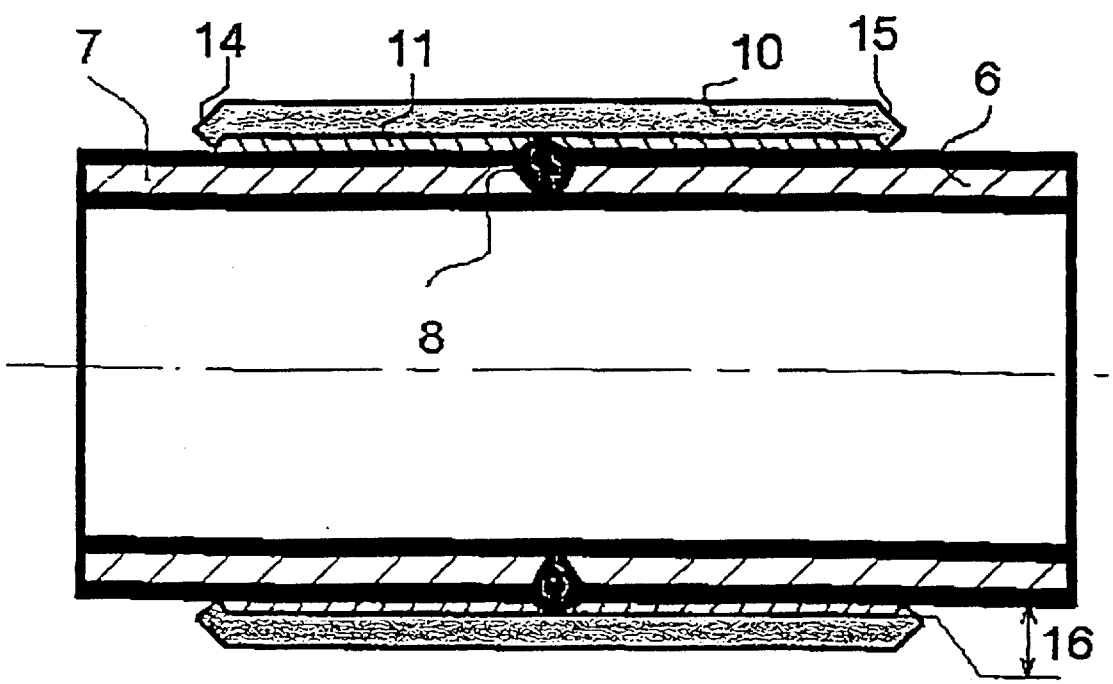
FIG. 4 is a cross-section of the reinforcing device of a second embodiment of the invention.

FIG. 4 shows the connection of a second embodiment mode in its final shape. This configuration of the bush 10 and its general characteristics are the same as those of the above embodiment. In this mode however the ends 14 and 15 of the bush 10 are transformed into a shape 16 preferably by cold shaping (crimping) to establish contact between the bush and the inner pipes 6 and 7 over the bush's full circumference. In this design the filler 11 then will be confined between the bush and the pipes.

Figure 5A:
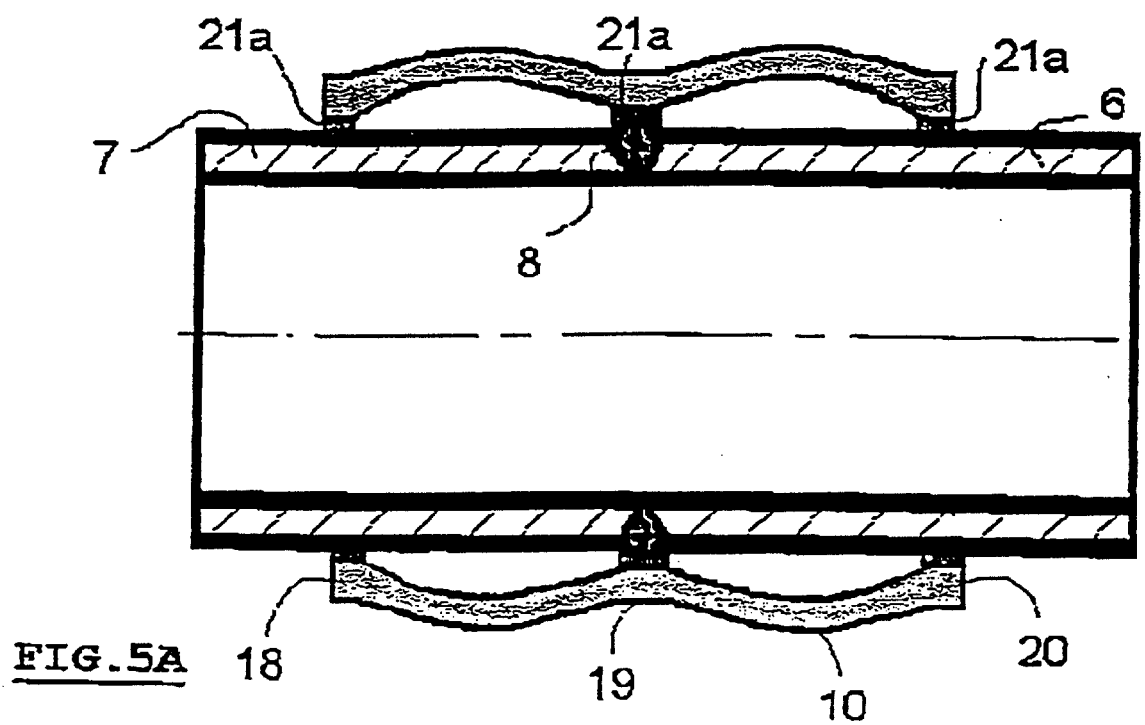
FIGS. 5a, 5b show another embodiment variation of the connection.
Figure 5B:
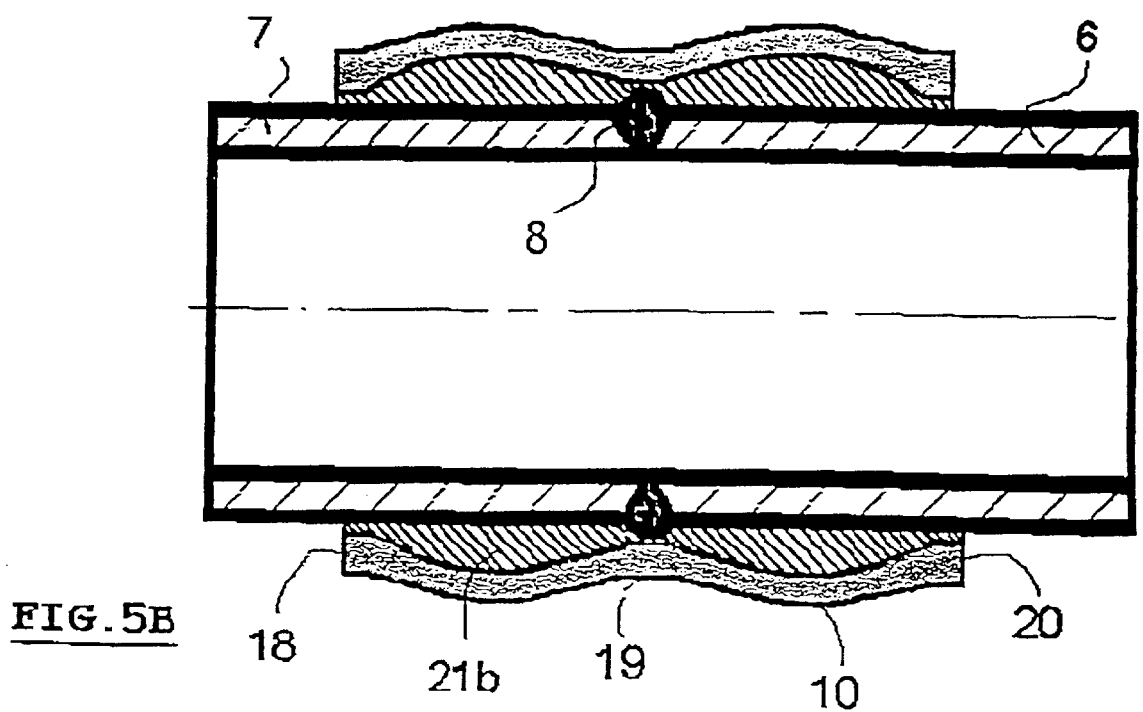

FIGS. 5a and 5b show two other embodiments of the connection means which illustrate the mechanical connection between the bush and the pipes. In these embodiment variations, the bush 10 is shaped to be directly applied at three different sites on the two pipes 6 and 7: at its free ends 18 and 20 and at its middle 19 to establish a strictly mechanical connection by interposing a material 21 between bush and pipes. The play between bush and pipes therefore is eliminated at said three sites. The Figure shows that this middle part is located exactly where the weld is. There may be a requirement to clad beforehand the inner pipes 6 and 7 with an interposing elastoplastic material 21 allowing locally spreading the pressure at the critical points 18, 19 and 20 to lower the danger of point stresses to the pipes. In FIG. 5a, the interposed material 21a is applied discretely at three spots and in FIG. 5b the material 21b is substantially spread out. In the same manner as above, this design assures shunting much of the bending torque into the bush. Illustratively this interposed material may be polypropylene or polyethylene or soft steel.

Obviously the invention may be implemented also by combining the above embodiment modes. The objective of the invention, namely to rigidify the weld, therefore has been attained. Clearly as well, regardless of a particular embodiment mode, the connection between the mutually opposite bush 10 and pipes 6 and 7 may be improved by surface treatment of said pipes.

What is claimed is:

1. A device reinforcing a circumferential weld (8) of two contiguous pipes (6, 7) constituting a conduit for transporting hydrocarbons at sea and comprising a rigidifying element (10) which is firmly joined to said pipes by a connecting means (11), said rigidifying element being slipped over the two pipes substantially to be opposite the weld, characterized in that the connecting means is mechanical and is implemented by shaping all or part (18, 19, 20) of the rigidifying element (10) onto the two pipes (6, 7).

2. Circumferential-weld reinforcing device as claimed in claim 1, characterized in that said shaping is implemented substantially near the ends and the middle portion of the rigidifying element (10).

3. Circumferential-weld reinforcing device (8) as claimed in claim 1, characterized in that an elastoplastic interposed material (21) is inserted either linewise/spotwise or continuously between the rigidifying element (10) and the pipes (6, 7) before shaping takes place in order to limit point stresses on the pipes.

4. Reinforcing device as claimed in claim 3, characterized in that the interposed material (21) is polypropylene or polyethylene or soft steel.

5. Weld-reinforcing device as claimed in claim 1, characterized in that the rigidifying element (10) is a hollow-cylindrical element or bush.

6. A device reinforcing a circumferential weld (8) of two contiguous pipes (6, 7) constituting a conduit for transporting hydrocarbons at sea and comprising an anti-bending rigidifying element (10) which is firmly joined to said pipes by a connection means (11), said rigidifying element covering the two pipes substantially above each weld, wherein the rigidying element comprises a bushing having ends aligned to retain a filler material, and the connection means is a filler material (11) located between the pipes (6, 7) and said rigidifying element (10) to reduce stresses caused by periodic bending of the conduit.

7. Reinforcing device for a circumferential weld (8) as claimed in claim 6, wherein the rigidifying bushing comprises the same material as the pipes (6, 7).

8. Reinforcing device for a circumferential weld (8) as claimed in claim 7, wherein the filler material (11) comprises a hardening material selected from the group consisting of resin and cement.

\* \* \* \* \*